(12) United States Patent
Hirota

(10) Patent No.: US 12,472,882 B2
(45) Date of Patent: Nov. 18, 2025

(54) CAMERA UNIT AND OCCUPANT MONITORING SYSTEM

(71) Applicant: Mitsubishi Electric Corporation, Tokyo (JP)

(72) Inventor: Hideyuki Hirota, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 59 days.

(21) Appl. No.: 18/286,720

(22) PCT Filed: Jun. 22, 2021

(86) PCT No.: PCT/JP2021/023500
§ 371 (c)(1),
(2) Date: Oct. 12, 2023

(87) PCT Pub. No.: WO2022/269732
PCT Pub. Date: Dec. 29, 2022

(65) Prior Publication Data
US 2024/0198925 A1    Jun. 20, 2024

(51) Int. Cl.
*H04N 23/00* (2023.01)
*B60R 1/29* (2022.01)
(Continued)

(52) U.S. Cl.
CPC ............... *B60R 11/04* (2013.01); *B60R 1/29* (2022.01); *H04N 23/23* (2023.01); *H04N 23/51* (2023.01);
(Continued)

(58) Field of Classification Search
CPC ............ B60R 11/04; B60R 1/29; B60R 2011/0022; B60R 2011/0045; H04N 23/23;
(Continued)

(56) References Cited

U.S. PATENT DOCUMENTS

| | | | |
|---|---|---|---|
| 6,198,409 B1 * | 3/2001 | Schofield | B60R 1/12 340/436 |
| 6,392,315 B1 * | 5/2002 | Jones | F02P 17/12 307/10.6 |

(Continued)

FOREIGN PATENT DOCUMENTS

| | | |
|---|---|---|
| EP | 3 184 370 A1 | 6/2017 |
| GB | 2 450 710 A | 1/2009 |

(Continued)

OTHER PUBLICATIONS

International Search Report (PCT/ISA/210) issued in PCT/JP2021/023500, dated Sep. 21, 2021.

*Primary Examiner* — Frank F Huang
(74) *Attorney, Agent, or Firm* — Birch, Stewart, Kolasch & Birch, LLP

(57) ABSTRACT

A camera unit is housed and attached in an internal space of a pillar, the camera unit including a plurality of modules that executes respective functions regarding camera imaging, and a housing having a dimension in such a manner that an outer shape of the housing around a longitudinal direction of the housing is accommodated in the internal space, the modules being mounted on the housing without protruding from the outer shape.

12 Claims, 6 Drawing Sheets

(51) Int. Cl.
*B60R 11/04* (2006.01)
*H04N 23/23* (2023.01)
*H04N 23/51* (2023.01)
*H04N 23/56* (2023.01)
*B60R 11/00* (2006.01)

(52) U.S. Cl.
CPC ...... *H04N 23/56* (2023.01); *B60R 2011/0022* (2013.01); *B60R 2011/0045* (2013.01)

(58) Field of Classification Search
CPC ........ H04N 23/51; H04N 23/56; H04N 23/57; G03B 2215/0503; G03B 15/05; G03B 17/02; G03B 30/00
See application file for complete search history.

(56) References Cited

U.S. PATENT DOCUMENTS

| | | | | |
|---|---|---|---|---|
| 6,720,920 | B2* | 4/2004 | Breed | G01S 13/931 342/357.31 |
| 7,079,017 | B2* | 7/2006 | Lang | G01S 15/931 340/436 |
| 7,579,940 | B2* | 8/2009 | Schofield | G02B 27/0101 701/487 |
| 2002/0167589 | A1* | 11/2002 | Schofield | B60R 1/26 348/E7.086 |
| 2005/0134983 | A1* | 6/2005 | Lynam | B60R 1/12 359/872 |
| 2006/0038108 | A1 | 2/2006 | Belau | |
| 2007/0073473 | A1* | 3/2007 | Altan | G01S 13/862 701/518 |
| 2007/0181810 | A1* | 8/2007 | Tan | G01S 7/4811 250/341.1 |
| 2010/0139995 | A1* | 6/2010 | Rudakevych | B62D 55/06 180/9.32 |
| 2011/0063445 | A1* | 3/2011 | Chew | G06V 20/52 348/E7.085 |

FOREIGN PATENT DOCUMENTS

| | | |
|---|---|---|
| JP | 2006-510322 A | 3/2006 |
| JP | 2007-22364 A | 2/2007 |
| JP | 2009-12751 A | 1/2009 |
| JP | 2017-118439 A | 6/2017 |

* cited by examiner

CAMERA UNIT AND OCCUPANT MONITORING SYSTEM

TECHNICAL FIELD

The present disclosure relates to a camera unit and an occupant monitoring system provided with the same.

BACKGROUND ART

In recent years, an occupant monitoring system that monitors a state of an occupant on the basis of image information of the occupant imaged by a camera unit mounted in a vehicle interior has become common. As the camera unit mounted in the vehicle interior, for example, there is a camera unit disclosed in Patent Literature 1. The camera unit includes a first printed wiring board and a second printed wiring board. The first printed wiring board is provided with a first component including an optical imaging sensor, and the second printed wiring board is provided with a second component other than the first component. The first printed wiring board and the second printed wiring board are provided on a metal substrate, and the metal substrate is bent in such a manner that the first printed wiring board is inclined at an optional angle with respect to the second printed wiring board.

The camera unit disclosed in Patent Literature 1 can be mounted in a roof liner by setting a bending angle of the metal substrate to an angle corresponding to a bent portion in a roof region of a vehicle.

CITATION LIST

Patent Literatures

Patent Literature 1: JP 2006-510322 A

SUMMARY OF INVENTION

Technical Problem

The conventional camera unit disclosed in Patent Literature 1 has a problem. The problem is that the metal substrate is bent and thereby a thickness perpendicular to a longitudinal direction increases, so that this cannot be housed and attached in an elongated housing space.

The present disclosure solves the above-described problem, and an object thereof is to obtain a camera unit that can be housed and attached in an elongated housing space.

Solution to Problem

A camera unit according to the present disclosure is housed and attached in an internal space of a pillar of a vehicle, the camera unit comprising: a step-shaped mount portion that is attached in the internal space of the pillar; a camera module to take an image of an object in the vehicle via an opening positioned inside the vehicle and formed in a cover included in the pillar; and an illumination module to illuminate the object in the vehicle via the opening, wherein the step-shaped mount portion includes: a first stepped surface having a first flat face directed to an inside of the vehicle; a second stepped surface having a second flat face positioned lower than the first flat face, and on a vehicle external side with respect to the first flat face; and a flat face extending from a lower end of the first stepped surface to an upper end of the second stepped surface, the camera module is provided on the first flat face, and the illumination module is provided on the second flat face, a vehicle-interior-side end portion of the illumination module is positioned higher than a vehicle-interior-side end portion of the camera module, and on a vehicle-interior side with respect to the vehicle-interior-side end portion of the camera module, the vehicle-interior-side end portion of the illumination module is positioned on a vehicle-interior side with respect to the first stepped surface.

Advantageous Effects of Invention

According to the present disclosure, the housing has a dimension in such a manner that the outer shape of the housing around the longitudinal direction of the housing is accommodated in the elongated housing space. Further, the plurality of modules that executes the respective functions regarding camera imaging is mounted without protruding from the outer shape of the housing around the longitudinal direction of the housing. Since the modules do not protrude from the outer shape of the housing which has a dimension in such a manner as to be accommodated in the elongated housing space, the camera unit according to the present disclosure can be housed and attached in the elongated housing space.

DESCRIPTION OF EMBODIMENTS

First Embodiment

Figure 1:
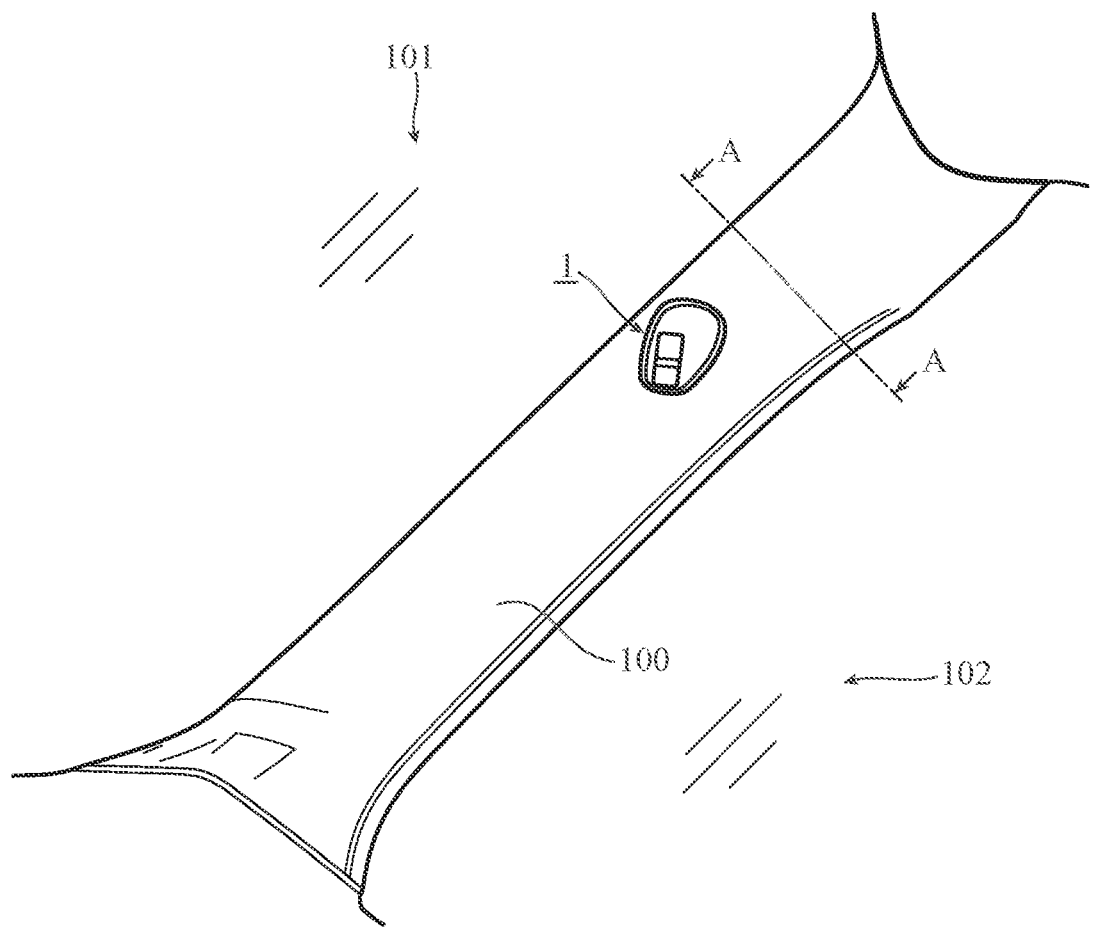
FIG. 1 is a perspective view illustrating a pillar to which a camera unit according to a first embodiment is attached.

FIG. 1 is a perspective view illustrating a pillar 100 to which a camera unit 1 according to a first embodiment is attached. The pillar 100 (A-pillar) is provided between a windshield 101 and a door glass 102. The camera unit 1 is attached to the pillar 100, for example, as illustrated in FIG. 1. The camera unit 1 attached to the pillar 100 can include, in its imaging visual field, an occupant sitting on a seat in a vehicle interior. When the pillar 100 is an A-pillar on a driver's seat side, the camera unit 1 can image a driver sitting on the driver's seat.

Figure 2:
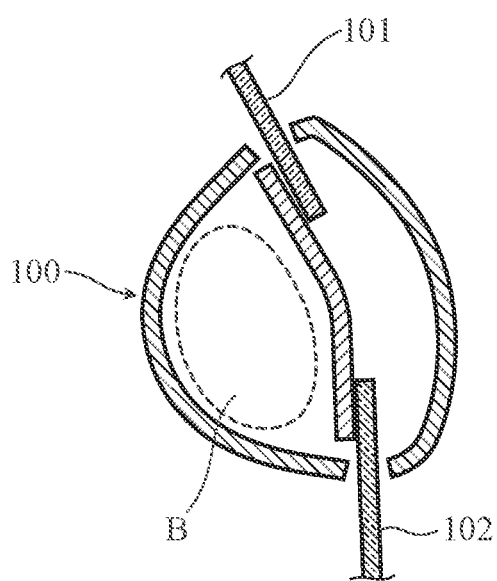
FIG. 2 is a cross-sectional view taken along line A-A in FIG. 1, schematically illustrating the pillar as seen in an arrow direction.

FIG. 2 is a cross-sectional view taken along line A-A in FIG. 1, schematically illustrating the pillar 100 as seen in an arrow direction. As illustrated in FIG. 2, the pillar 100 is a pillar having a structure obtained by combining a member inside a vehicle and a member outside the vehicle, and includes an internal space B indicated by a broken line. The internal space B is an space which is elongated in a longitudinal direction of the pillar 100, and in which the camera unit 1 is housed and attached.

Figure 3:
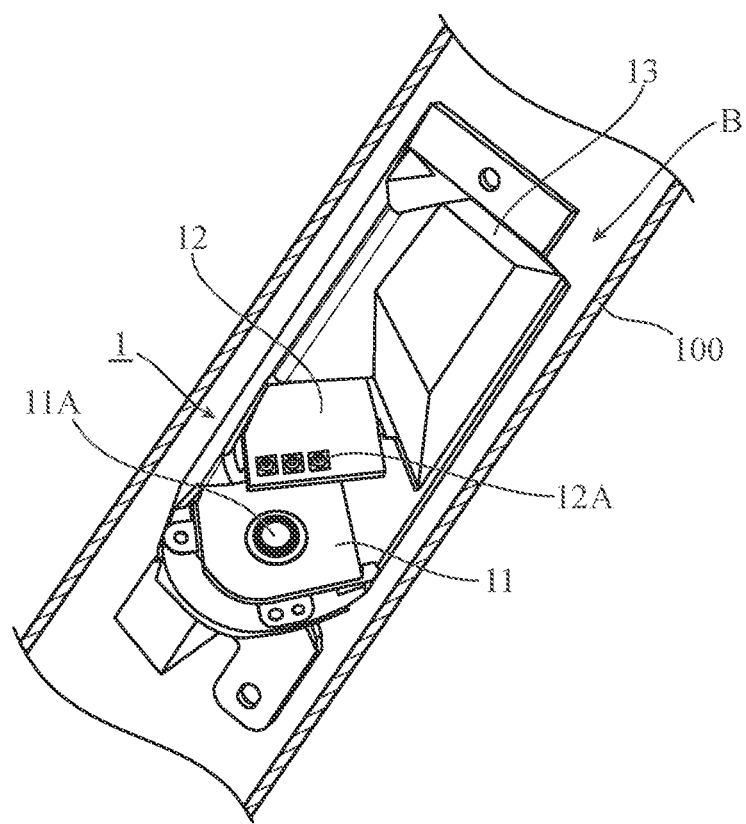
FIG. 3 is a perspective view illustrating the camera unit according to the first embodiment housed in an internal space of the pillar of a vehicle.
Figure 4:
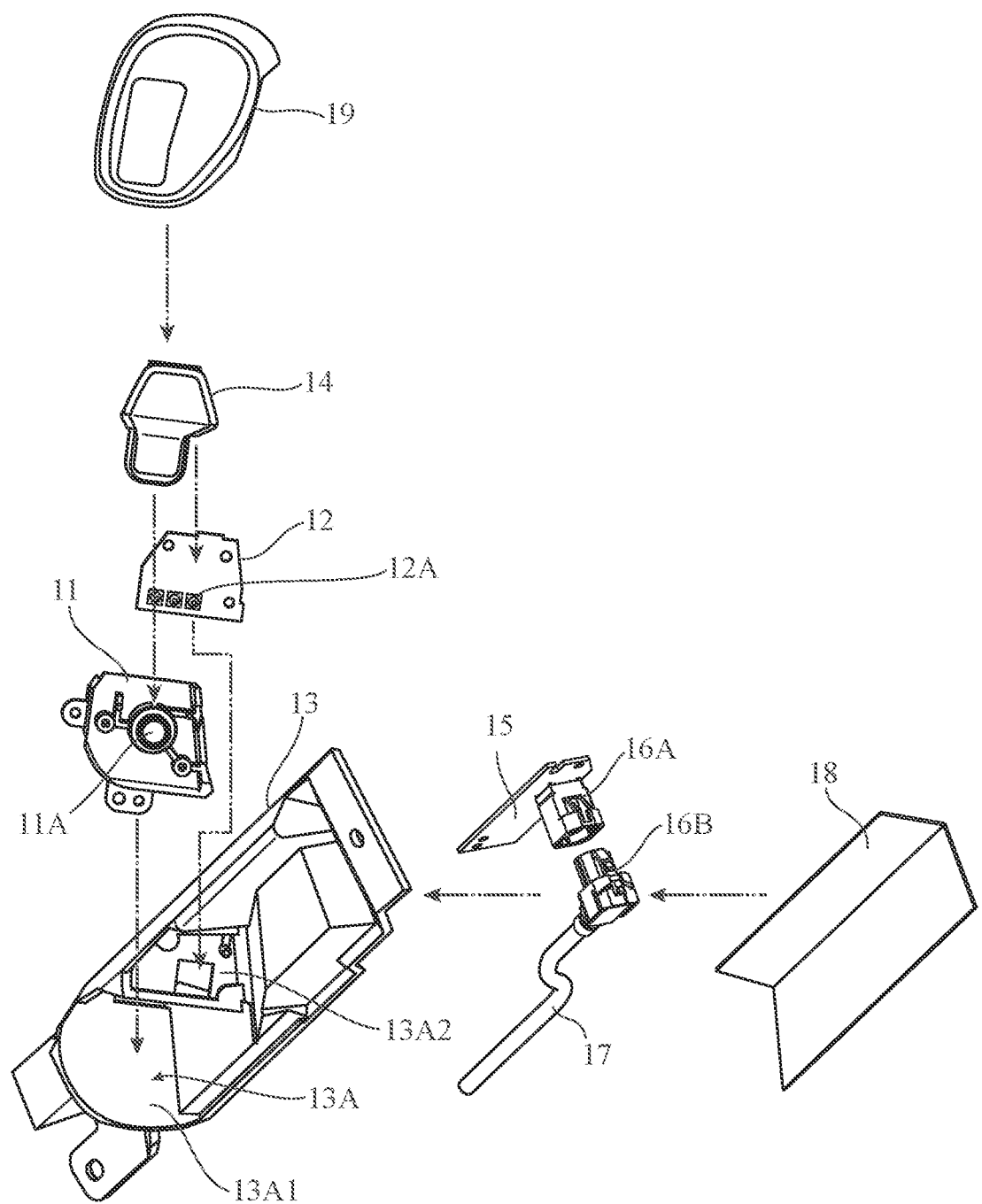
FIG. 4 is an exploded perspective view illustrating a configuration example of the camera unit according to the first embodiment.

FIG. 3 is a perspective view illustrating the camera unit 1 housed in the internal space B of the pillar 100 of the vehicle. FIG. 4 is an exploded perspective view illustrating a configuration example of the camera unit 1. The camera unit 1 is housed in the internal space B in the pillar 100 as illustrated in FIG. 3. The camera unit 1 is provided with modules that execute respective functions regarding camera imaging. For example, as illustrated in FIG. 4, the camera unit 1 is provided with a camera module 11, an illumination module 12, a housing 13, an infrared transmission screen 14, and an interface module 15.

The functions regarding the camera imaging include, for example, an imaging function, a function of illuminating an imaging area, and an interface function for imaging information acquired by the imaging function. The camera module 11 is a module having the imaging function, and is provided with, for example, an infrared camera 11A. The infrared camera 11A has the imaging function of taking an infrared image depending on intensity of received infrared light, and is mounted on a substrate individually provided for the camera module 11. The camera module 11 includes the substrate and the infrared camera 11A.

The illumination module 12 is a module including a light emitting element that illuminates an imaging area of the camera module 11, and is provided with, for example, an infrared light emitting diode (LED) 12A. The infrared LED 12A has an illuminating function of applying infrared light to an imaging area of the infrared camera 11A, and is mounted on a substrate individually provided for the illumination module 12.

The interface module 15 is a module that outputs imaging information (a still image or a moving image) taken by the camera module 11 to an external device. The interface module 15 is provided with a connector 16A. The connector 16A has the interface function and is mounted on a substrate individually provided for the interface module 15.

The substrate on which the connector 16A is mounted is connected to the substrate on which the infrared camera 11A is mounted via, for example, a signal line. A connector 16B is attached to the connector 16A. The imaging information taken by the camera module 11 is output to the external device via a vehicle cable 17 connected to the connector 16B in a state in which the connector 16A and the connector 16B are attached to each other.

As illustrated in FIGS. 3 and 4, the housing 13 is a member having an elongated shape. An outer shape of the housing 13 around a longitudinal direction of the housing 13 has a dimension in such a manner as to be accommodated in the internal space B of the pillar 100. The camera module 11, the illumination module 12, and the interface module 15 are mounted in such a manner as not to protrude from the outer shape of the housing 13 around the longitudinal direction of the housing 13.

For example, as illustrated in FIG. 4, the housing 13 includes a mount portion 13A which is formed into a stepped shape in the longitudinal direction, and which is inside the outer shape of the housing 13 around the longitudinal direction. The mount portion 13A includes a stepped surface 13A1 and a stepped surface 13A2 in front of the stepped surface 13A1. The housing 13 further includes a recess for mounting, on a side opposite to the mount portion 13A, that is, on a "back side" when a side on which the mount portion 13A is provided is a "front side".

The camera module 11 is mounted on the stepped surface 13A1 of the mount portion 13A in such a manner that the infrared camera 11A does not protrude from the outer shape of the housing 13 around the longitudinal direction of the housing 13. The illumination module 12 is mounted on the stepped surface 13A2 of the mount portion 13A in such a manner that the infrared LED 12A does not protrude from the outer shape of the housing 13 around the longitudinal direction of the housing 13. The interface module 15 is mounted in the recess provided on the back side of the housing 13 in such a manner that the connector 16A does not protrude from the outer shape of the housing 13 around the longitudinal direction of the housing 13.

The camera module 11, the illumination module 12, and the interface module 15 do not protrude from the outer shape which has a dimension in such a manner as to be accommodated in an elongated housing space such as the internal space B of the pillar 100. Thus, the camera unit 1 can be housed and attached in the elongated housing space.

The infrared transmission screen 14 is a member that transmits infrared light but does not transmit visible light, and is provided in front of the camera module 11 and the illumination module 12 in the housing 13. By providing the infrared transmission screen 14, the infrared light from the infrared camera 11A and the infrared LED 12A is transmitted, but the camera module 11 and the illumination module 12 are not visible from the outside. As a result, the design of the camera unit 1 is improved.

A rear cover 18 is a metal cover member that covers the interface module 15 mounted on the housing 13. For example, the rear cover 18 is electrically connected to the ground of the vehicle to have a ground potential. An electromagnetic noise coming from outside the camera unit 1 is blocked by the rear cover 18. As a result, it is possible to prevent the electromagnetic noise from being superimposed on a signal propagated from the interface module 15 to the external device.

A design panel 19 is disposed in front of the infrared transmission screen 14. For example, the camera unit 1 is mounted in a state in which the infrared transmission screen 14 is exposed from an opening provided in the pillar 100. The design panel 19 is disposed in front of the infrared transmission screen 14 exposed from the opening in the pillar 100 to be mounted on the pillar 100. As a result, the design of the camera unit 1 is improved.

In the imaging of the vehicle interior, light emitted from the infrared LED 12A needs to be applied to the imaging area of the infrared camera 11A. However, in the camera unit 1, the infrared camera 11A is mounted at a position different from that of the infrared LED 12A. Therefore, it is necessary to appropriately set the orientation of the infrared camera 11A disposed in the housing 13 and the orientation of the infrared LED 12A disposed in the housing 13. Further, when the light emitted from the infrared LED 12A directly enters the infrared camera 11A, there is a possibility that overexposure occurs in an image taken by the infrared camera 11A.

To deal with the above, in the camera unit 1, the camera module 11 is mounted on the stepped surface 13A1 of the mount portion 13A, and the illumination module 12 is mounted on the stepped surface 13A2 of the mount portion 13A. As a result, the light emitted from the infrared LED 12A is appropriately applied to the imaging area of the infrared camera 11A. Moreover, the light emitted from the infrared LED 12A is prevented from directly entering the infrared camera 11A.

Figure 5:
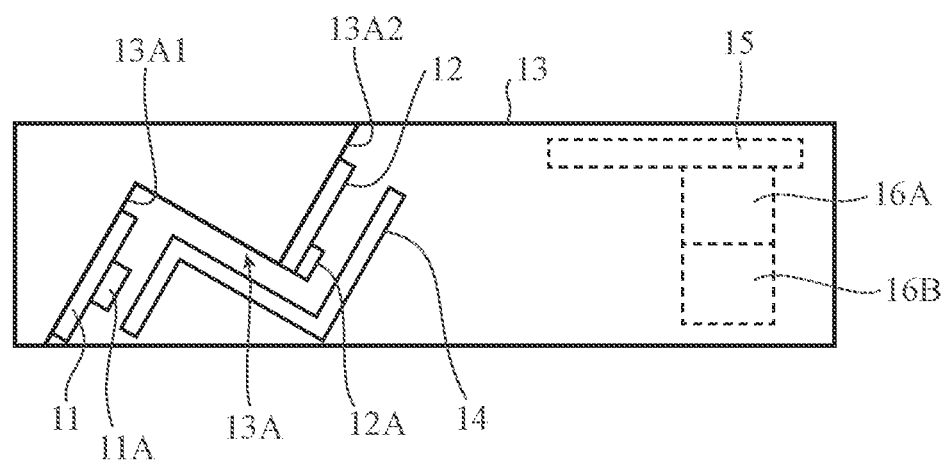
FIG. 5 is a schematic diagram schematically illustrating a mounting state of a camera module and an illumination module in the camera unit according to the first embodiment.

FIG. 5 is a schematic diagram schematically illustrating a mounting state of the camera module 11 and the illumination module 12 in the camera unit 1, and illustrates a structure on the front side of the housing 13 provided with the mount portion 13A. In FIG. 5, components provided on the front side of the housing 13 are indicated by solid lines, and components provided on the back side of the housing 13 are indicated by broken lines.

Figure 6:
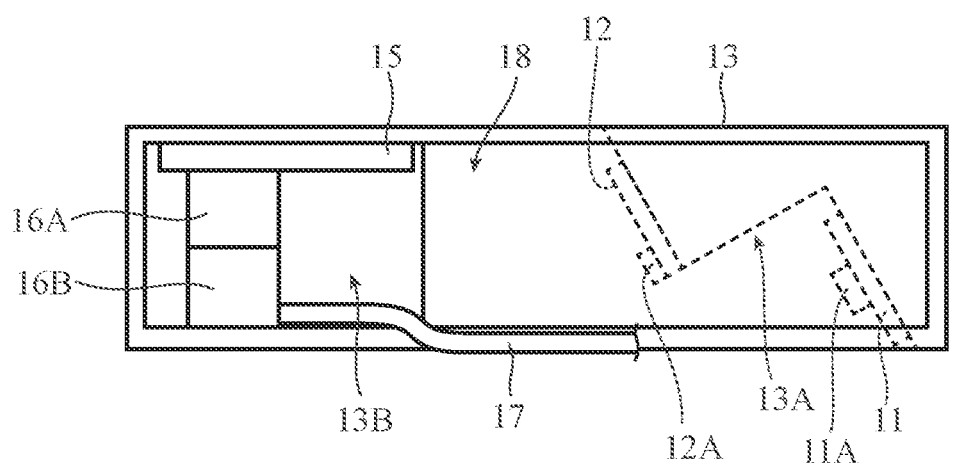
FIG. 6 is a schematic diagram schematically illustrating a mounting state of an interface module in the camera unit according to the first embodiment.

FIG. 6 is a schematic diagram schematically illustrating a mounting state of the interface module 15 in the camera unit 1, and illustrates a structure on the back side of the housing 13 provided with the recess 13B to which the interface module 15 is attached. In FIG. 6, the components provided on the back side of the housing 13 are indicated by solid lines, and the components provided on the front side of the housing 13 are indicated by broken lines. In FIG. 6, the rear cover 18 is illustrated in a transparent manner in order to make components covered with the rear cover 18 visible.

In the mount portion 13A, the stepped surface 13A1 and the stepped surface 13A2 are flat surfaces adjacent to each other in plane view. Therefore, the optical axis of the infrared camera 11A and the optical axis of the infrared LED 12A are substantially parallel to each other. That is, a light emitting unit of the infrared camera 11A and a light emitting unit of the infrared LED 12A can be set to substantially the same orientation. As a result, in the camera unit 1, the light from the infrared LED 12A is appropriately applied to the imaging area of the infrared camera 11A.

In the mount portion 13A, the camera module 11 and the illumination module 12 are mounted not on a common flat surface but on separate flat surfaces. As a result, the mount portion 13A can individually set an inclination angle of the stepped surface 13A1 on which the camera module 11 is mounted and an inclination angle of the stepped surface 13A2 on which the illumination module 12 is mounted.

For example, the inclination angle of the stepped surface 13A1 and the inclination angle of the stepped surface 13A2 may be the same in order to make the optical axis of the infrared camera 11A and the optical axis of the infrared LED 12A correctly parallel to each other in a state in which the camera module 11 and the illumination module 12 are mounted on the mount portion 13A. Alternatively, by setting the inclination angle of the stepped surface 13A1 and the inclination angle of the stepped surface 13A2 to different angles, the optical axis of one of the infrared camera 11A and the infrared LED 12A may intersect with the optical axis of the other one of them within the imaging area of the infrared camera 11A.

Moreover, in the camera unit 1, the illumination module 12 is mounted on the stepped surface 13A2 in front of the camera module 11 as illustrated in FIG. 5 in the mount portion 13A. Since the camera module 11 and the illumination module 12 are disposed as described above, the light emitted from the infrared LED 12A is applied to the imaging area of the infrared camera 11A without directly entering the infrared camera 11A. As a result, the camera unit 1 can prevent occurrence of overexposure in the image taken by the infrared camera 11A.

When an imaging target of the camera unit 1 is the driver, the camera unit 1 is mounted on, for example, the A-pillar on the driver's seat side. In the mount portion 13A, the stepped surface 13A2 is located in front of the stepped surface 13A1. When the camera unit 1 is attached to the A-pillar on the driver's seat side, the infrared LED 12A provided on the stepped surface 13A2 is disposed closer to the driver than the infrared camera 11A provided on the stepped surface 13A1. As a result, the light from the infrared LED 12A does not directly enter the infrared camera 11A, and the infrared LED 12A can apply the infrared light to the driver without being interrupted by the camera module 11.

As illustrated in FIG. 6, the recess 13B for mounting the interface module 15 is provided on the back side of the housing 13. The recess 13B can house the interface module 15 in a state in which the connector 16B is attached to the connector 16A. Therefore, the interface module 15 is mounted in the recess 13B in such a manner as not to protrude from the outer shape of the housing 13 around the longitudinal direction of the housing 13.

The front side of the housing 13 protrudes by a depth of the recess 13B on the back side within a range which does not allow the front side to protrude from the outer shape of the housing 13 around the longitudinal direction of the housing 13. In this situation, the stepped surface 13A1 and the stepped surface 13A2 of the mount portion 13A are formed in such a manner that the infrared camera 11A and the infrared LED 12A face the imaging target while avoiding the protruding portion in a state in which the camera unit 1 is attached to the pillar 100. Since the imaging visual field of the infrared camera 11A and an irradiation area of the infrared LED 12A do not overlap the protruding portion on the front side of the housing 13, the camera module 11 and the illumination module 12 can appropriately image and illuminate the imaging target.

Moreover, as illustrated in FIG. 6, the rear cover 18, which is the metal cover member, is provided on the back side of the housing 13 in such a manner as to cover the interface module 15. The electromagnetic noise propagated from outside the camera unit 1 is blocked by the rear cover 18. As a result, it is possible to prevent the electromagnetic noise from being superimposed on a signal propagated from the interface module 15 to the external device.

Figure 7:
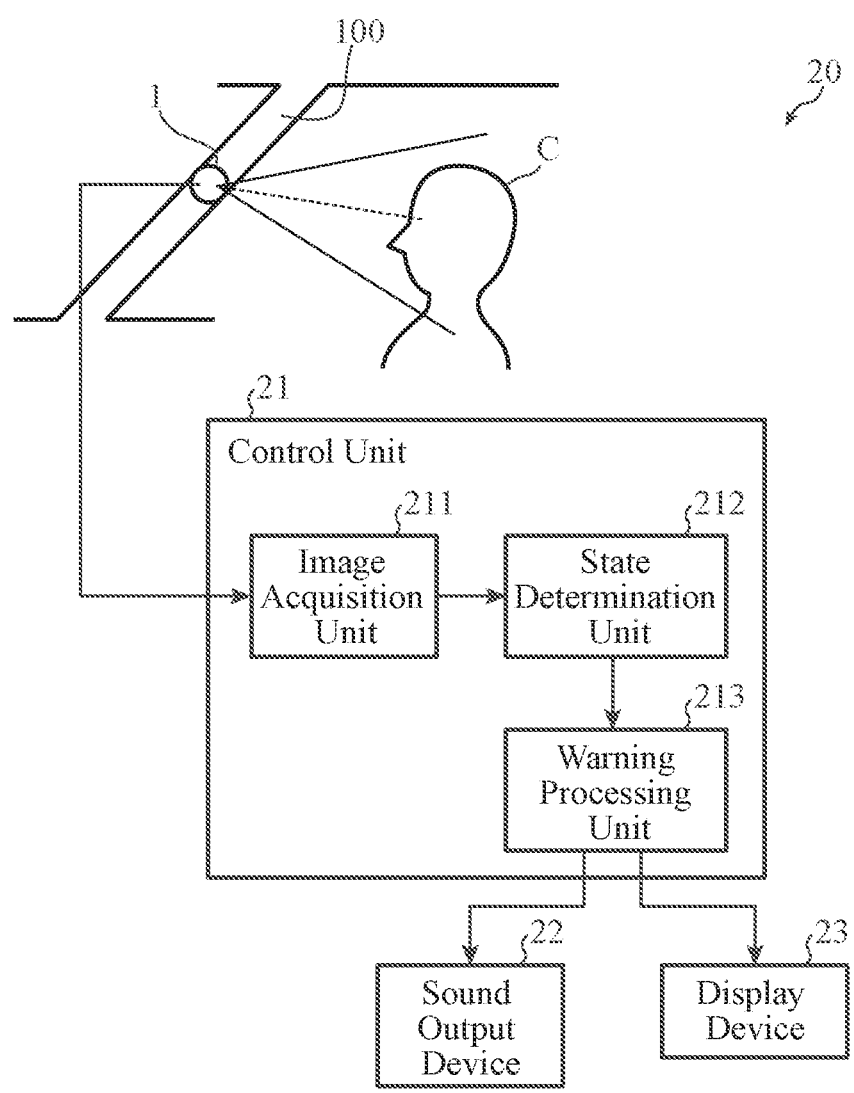
FIG. 7 is a block diagram illustrating a configuration example of an occupant monitoring system according to the first embodiment.

FIG. 7 is a block diagram illustrating a configuration example of an occupant monitoring system 20 according to the first embodiment. In FIG. 7, the occupant monitoring system 20 monitors a state of an occupant C of the vehicle using imaging information of the occupant C imaged by the camera unit 1 attached to the pillar 100 of the vehicle. The occupant monitoring system 20 is provided with a control unit 21, a sound output device 22, and a display device 23 in addition to the camera unit 1.

The control unit 21 monitors the state of the occupant C using the imaging information of the occupant C. The sound output device 22 is a device that outputs a sound in the vehicle interior, and outputs sound information on the basis of control information output from the control unit 21, for example. The sound output device 22 may be an in-vehicle speaker or a speaker provided in an information terminal brought into the vehicle interior.

The display device 23 is a device that displays information output from the control unit 21, and displays, for example, information indicating the state of the occupant C determined by the control unit 21 or warning information depending on the state of the occupant C. The display device 23 may be a display provided in the vehicle interior or a display provided on an information terminal brought into the vehicle interior.

As illustrated in FIG. 7, the control unit 21 is provided with an image acquisition unit 211, a state determination unit 212, and a warning processing unit 213. The image acquisition unit 211 acquires the imaging information of the occupant C imaged by the camera unit 1. The state determination unit 212 analyzes the image in which the occupant C is imaged to acquire face information including a line-of-sight direction of the occupant C, and determines the state of the occupant C such as whether the occupant C is looking aside or not or whether the occupant C is dozing or not using the face information of the occupant C.

The warning processing unit 213 performs warning processing on the basis of a determination result of the state of the occupant C by the state determination unit 212. For example, when it is determined that the driver is looking aside on the basis of the face information of the occupant C who is the driver, the warning processing unit 213 warns the driver using both or one of the sound output device 22 and the display device 23. When it is determined that the occupant C is dozing on the basis of the face information indicating that the occupant C closes the eyes, the warning processing unit 213 warns the occupant C using both or one of the sound output device 22 and the display device 23.

For example, when the imaging target is the driver and a camera unit is provided on the dashboard in front of the driver, the steering wheel of the vehicle is between the driver and the camera unit. Therefore, when the steering wheel blocks the imaging visual field of the camera unit, the camera unit cannot appropriately image the driver. When the camera unit is disposed at the center of the dashboard while avoiding the steering wheel, the camera unit images the driver in a state of looking up at the driver from below, so that there is a case where it is not possible to appropriately image whether the driver's eyes are open or not. Similarly, when the camera unit is provided near the rearview mirror in the vehicle interior, the camera unit images the driver in a state of looking down at the driver from above, so that there is a possibility that it is not possible to appropriately image whether the driver's eyes are open or not.

On the other hand, in the occupant monitoring system 20, the camera unit 1 is attached to the pillar 100. The camera unit 1 attached to the pillar 100 has no blocking object such as the steering wheel between the camera unit 1 and the driver, and can image the driver at substantially the same height as the driver's head. Therefore, the camera unit 1 can take an image that makes it easy to analyze the face, particularly the line of sight of the driver, so that the occupant monitoring system 20 can correctly determine the state of the driver.

Functions of the image acquisition unit 211, the state determination unit 212, and the warning processing unit 213 in the occupant monitoring system 20 are implemented by a processing circuit. That is, the occupant monitoring system 20 is provided with a processing circuit for executing a series of processing of monitoring the state of the occupant of the vehicle. The processing circuit may be a hardware processing circuit or a processor that executes a program stored in a memory.

As described above, the camera unit 1 according to the first embodiment is provided with the camera module 11, the illumination module 12, the interface module 15, and the housing 13. The housing 13 has a dimension that enables the outer shape of the housing 13 around the longitudinal direction thereof to be accommodated in the internal space B of the elongated pillar 100. The modules 11, 12, and 15 are mounted without protruding from the outer shape of the housing 13 around the longitudinal direction of the housing 13. Since the modules 11, 12, and 15 do not protrude from the outer shape which has a dimension in such a manner as to be accommodated in the internal space B of the pillar 100, the camera unit 1 can be housed and attached in the internal space B of the pillar 100.

In the camera unit 1 according to the first embodiment, the housing 13 includes the step-shaped mount portion 13A. The illumination module 12 is mounted on the stepped surface 13A2 in front of the camera module 11 in the mount portion 13A. As a result, the camera unit 1 can prevent the light from the infrared LED 12A from directly entering the infrared camera 11A.

In the camera unit 1 according to the first embodiment, the camera module 11 is the module including the infrared camera 11A, and the illumination module 12 is the module including the infrared LED 12A that emits the infrared light as illumination light. The infrared transmission screen 14 is provided in front of the camera module 11 and the illumination module 12 in the housing 13.

By the infrared transmission screen 14, the infrared light from the infrared camera 11A and the infrared LED 12A is transmitted, but the camera module 11 and the illumination module 12 are not visible from the outside. As a result, the design of the camera unit 1 is improved.

The camera unit 1 according to the first embodiment is provided with the rear cover 18 that covers the interface module 15. Since the rear cover 18 blocks the electromagnetic noise coming from outside the camera unit 1, it is possible to prevent the electromagnetic noise from being superimposed on the signal propagated from the interface module 15 to the external device.

The camera unit 1 according to the first embodiment is provided with the design panel 19 provided in front of the infrared transmission screen 14. Since the design panel 19 covers an area around the opening of the pillar 100, the design of the camera unit 1 is improved.

The occupant monitoring system 20 according to the first embodiment is provided with the camera unit 1, and the control unit 21 that monitors the occupant C of the vehicle using the imaging information of the occupant C imaged by the camera unit 1. Since the camera unit 1 can take the image that makes it easy to analyze the state of the driver, the occupant monitoring system 20 can correctly determine the state of the driver.

Any component of the embodiment may be modified, or any component of the embodiment may be omitted.

INDUSTRIAL APPLICABILITY

The camera unit according to the present disclosure can be used, for example, in a driver monitoring system that monitors the state of a driver.

REFERENCE SIGNS LIST

1: camera unit, 11: camera module, 11A: infrared camera, 12: illumination module, 12A: infrared LED, 13: housing, 13A: mount portion, 13B: recess, 13A1, 13A2: stepped surface, 14: infrared transmission screen, 15: interface module, 16A, 16B: connector, 17: vehicle cable, 18: rear cover, 19: design panel, 20: occupant monitoring system, 21: control unit, 22: sound output device, 23: display device, 211: image acquisition unit, 212: state determination unit, 213: warning processing unit

The invention claimed is:
1. A camera unit that is housed and attached in an internal space of a pillar of a vehicle, the camera unit comprising:
a step-shaped mount portion that is attached in the internal space of the pillar;
a camera module to take an image of an object in the vehicle via an opening positioned inside the vehicle and formed in a cover included in the pillar; and
an illumination module to illuminate the object in the vehicle via the opening, wherein the pillar corresponds to an A-pillar provided between a windshield and a door glass of the vehicle, and wherein the step-shaped mount portion includes:
a first stepped surface having a first flat face directed to an inside of the vehicle;
a second stepped surface having a second flat face positioned lower than the first flat face, and on a vehicle external side with respect to the first flat face; and
a flat face extending from a lower end of the first stepped surface to an upper end of the second stepped surface,
the illumination module is provided on the first flat face, and the camera module is provided on the second flat face,
a vehicle-interior-side end portion of the illumination module is positioned higher than a vehicle-interior-side end portion of the camera module, and on a vehicle-interior side with respect to the vehicle-interior-side end portion of the camera module,
the vehicle-interior-side end portion of the illumination module is positioned on a vehicle-interior side with respect to the first stepped surface.

2. A camera unit that is housed and attached in an internal space of a pillar of a vehicle, the camera unit comprising:
a step-shaped mount portion that is attached in the internal space of the pillar;
a camera module to take an image of an object in the vehicle via an opening positioned inside the vehicle and formed in a cover included in the pillar; and
an illumination module to illuminate the object in the vehicle via the opening,
wherein the pillar corresponds to an A-pillar provided between a windshield and a door glass of the vehicle and wherein the step-shaped mount portion includes:
a first stepped surface having a first flat face directed to an inside of the vehicle;
a second stepped surface having a second flat face positioned lower than the first flat face, and on a vehicle external side with respect to the first flat face; and
a flat face extending from a lower end of the first stepped surface to an upper end of the second stepped surface,
the illumination module is provided on the first flat face, and the camera module is provided on the second flat face,
a vehicle-interior-side end portion of the illumination module is positioned higher than a vehicle-interior-side end portion of the camera module, and on a vehicle-interior side with respect to the vehicle-interior-side end portion of the camera module,
the vehicle-interior-side end portion of the camera module is positioned lower than the flat face extending the lower end of the first stepped surface to the upper end of the second stepped surface, and on a vehicle-interior side with respect to the second stepped face.

3. The camera unit according to claim 1, wherein
the first face is a first longitudinal face,
the second face is a second longitudinal face,
the flat face extending from the lower end of the first stepped surface to the upper end of the second stepped surface is a lateral face.

4. The camera unit according to claim 1, wherein
the pilar includes a first member provided outside the vehicle and a second member provided inside the vehicle,
the camera module and the illumination module are disposed in the internal space formed by combining the first and second members.

5. The camera unit according to claim 1, wherein
the flat face extending from the lower end of the first stepped surface to the upper end of the second stepped surface is a lateral face,
the pilar includes a first member provided outside the vehicle and a second member provided inside the vehicle,
the lateral face is disposed in the internal space formed by combining the first and second members.

6. The camera unit according to claim 1, wherein
the pilar includes a first member provided outside the vehicle and a second member provided inside the vehicle,
the interface module is configured to connect each of the camera module and the illumination module to an external device and housed in the internal space formed by combining the first and second members.

7. An occupant monitoring system comprising:
the camera unit according to claim 1; and
processing circuitry to monitor an occupant of the vehicle using the imaging information of the occupant imaged by the camera unit.

8. The camera unit according to claim 2, wherein
the first face is a first longitudinal face,
the second face is a second longitudinal face,
the flat face extending from the lower end of the first stepped surface to the upper end of the second stepped surface is a lateral face.

9. The camera unit according to claim 2, wherein
the pilar includes a first member provided outside the vehicle and a second member provided inside the vehicle,
the camera module and the illumination module are disposed in the internal space formed by combining the first and second members.

10. The camera unit according to claim 2, wherein
the flat face extending from the lower end of the first stepped surface to the upper end of the second stepped surface is a lateral face,
the pilar includes a first member provided outside the vehicle and a second member provided inside the vehicle,
the lateral face is disposed in the internal space formed by combining the first and second members.

11. The camera unit according to claim 2, wherein
the pilar includes a first member provided outside the vehicle and a second member provided inside the vehicle,
the interface module is configured to connect each of the camera module and the illumination module to the external device and housed in the internal space formed by combining the first and second members.

12. An occupant monitoring system comprising:
the camera unit according to claim 2; and
processing circuitry to monitor an occupant of the vehicle using the imaging information of the occupant imaged by the camera unit.

* * * * *